United States Patent [19]

Kopecky et al.

[11] Patent Number: 5,090,630
[45] Date of Patent: Feb. 25, 1992

[54] BALE GRINDER WITH LIFT AND CARRIER FORKS

[75] Inventors: Ivyl D. Kopecky, Ypsilanti; Ruben D. Morlock, Jamestown, both of N. Dak.

[73] Assignee: Haybuster Manufacturing Inc., Jamestown, N. Dak.

[21] Appl. No.: 552,436

[22] Filed: Jul. 13, 1990

[51] Int. Cl.⁵ .............................................. A01D 55/00
[52] U.S. Cl. .................................. 241/279; 241/101.7; 241/605; 241/282.1; 414/24.5; 414/911
[58] Field of Search ................. 241/101 A, 101.7, 243; 414/24.5, 911, 632, 659, 663

[56] References Cited

U.S. PATENT DOCUMENTS

| | | | |
|---|---|---|---|
| 3,472,408 | 10/1969 | Hendricks et al. | 414/632 |
| 3,999,674 | 12/1976 | Meitl | 241/101 A X |
| 4,448,361 | 5/1984 | Marcy | 241/101.7 |
| 4,449,672 | 5/1984 | Morlock et al. | 241/101.7 |
| 4,573,845 | 3/1986 | Carpenter | 414/24.5 |
| 4,634,336 | 1/1987 | Pearce | 414/24.5 X |
| 4,930,964 | 6/1990 | Doan | 414/911 X |

Primary Examiner—Mark Rosenbaum
Assistant Examiner—Frances Chun

[57] ABSTRACT

A bale shredder is provided with a loading fork along a side of the shredder that will lift a first bale from the ground and move it into the shredder. The loading fork includes a support platform portion that is used for lifting and supporting a second bale with a first bale remaining in the bale shredding chamber, so that both bales can be transported to a location for shredding. The fork is operated by a single hydraulic cylinder that will tilt the bale into a position on a main support platform, and which has a slide plate that moves the bale closer to the chamber when the fork is tilted upwardly a sufficient amount. Further upward tilting causes the bale to tumble into the bale chamber for shredding.

8 Claims, 8 Drawing Sheets

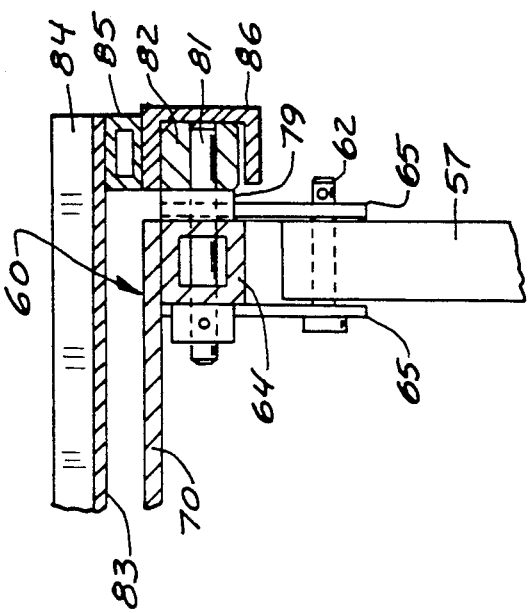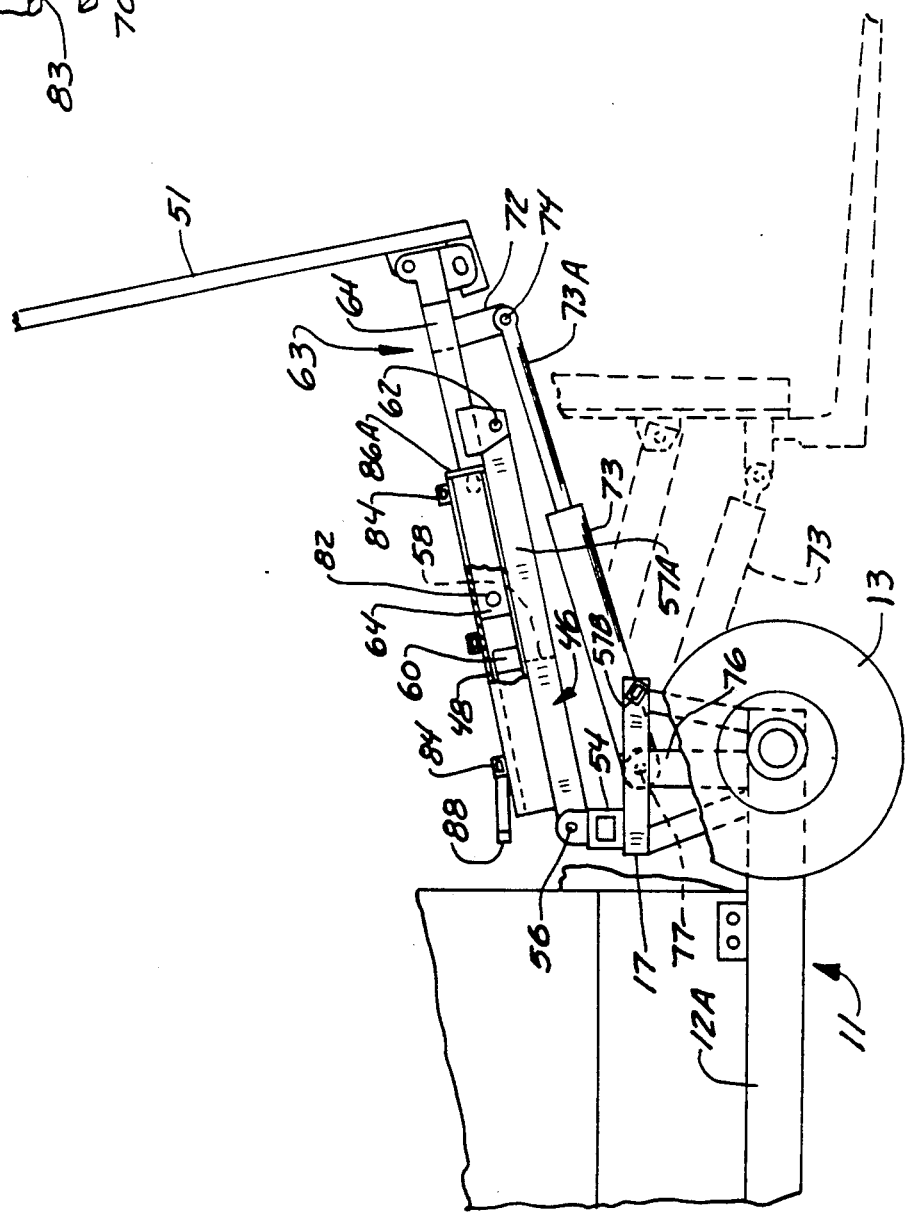

BALE GRINDER WITH LIFT AND CARRIER FORKS

BACKGROUND OF THE INVENTION

The present invention relates to a bale grinder or shredder which provides a flail type bale grinder that will handle large bales of material and will shred it for various purposes, and which includes a loading fork that can be used for loading one bale into the grinder, and then lifting another bale and holding it in a stored position until the first bale has been shredded.

U.S. Pat. No. 4,449,672 shows a bale grinder or shredder of the type disclosed herein, and the flail or grinding cylinder, feeding system, and finished material distribution arrangement are the same. In this form of the invention, however, the rear portions of the frame are used for mounting a lift fork including a pair of tines mounted onto a backing member that will not only permit loading the bale directly into a bale chamber where it is ground or shredded, but also permits lifting and storing a second bale on the fork while there still is a bale in the grinding or shredding chamber.

Additionally, tub type bale grinders for hay that have lift forks attached to the tub have been known, as exemplified by U.S. Pat. No. 4,448,361, but that device is intended to load the hay bale directly into the grinding tub, and does not permit storage of a second bale.

The present invention reduces the number of trips to a field, for example, and permits sequential mulching or shredding two bales moved from the field or from storage at the same time.

SUMMARY OF THE INVENTION

The present invention provides a structure for loading and storing a pair of bales on a mobile grinder. A rear loading fork is used for lifting the bales. The forks are operated with respect to a platform at the rear of the grinder or shredder adjacent the bale shredding chamber. The back wall or frame on which the tines are mounted will support an end of a bale to be lifted, when the bale is on the ground, and during the lifting process a slide plate mounted on the back frame which shifts or slides moves the bale toward a chamber in which a flail is effective to shred the bale material. The fork can be lowered and a second bale lifted, and stored on its end on the fork back wall member and pivoting fork support at the base of the fork with the fork tines positioned substantially vertically, until the first bale has been shredded, and then the second bale can be moved into the bale shredding chamber for such shredding action.

The fork tines are adjustable laterally, very easily, for different size bales. Suitable guide members are used for guiding the hay bales into the shredding chamber. The back wall member, with its slide plate support insures that gravity will move the bale as the fork is raised into a position where it will slide toward and tumble into the bale shredding chamber without any manual moving of the bale. The device will permit hauling and processing to large round bales of hay or other material, and makes an ideal device for range feeding and bunk feeding where there is a substantial amount of material that has to be fed, as well as for mulching the ground where fruits and vegetables grow because of the ability to lift and transport two bales at once and shred the bales sequentially. The handling is quite easy for one person, and the lifting, loading and shredding operations can be done without leaving the towing tractor that is used.

BRIEF DESCRIPTION OF THE DRAWINGS

FIG. 4A is a sectional view taken as on line 4A—4A in FIG. 4;

FIG. 5 is a view taken substantially on the same line as FIG. 4 showing the bale lift fork and support platform in a partially raised position;

DETAILED DESCRIPTION OF THE PREFERRED EMBODIMENTS

Figure 1:
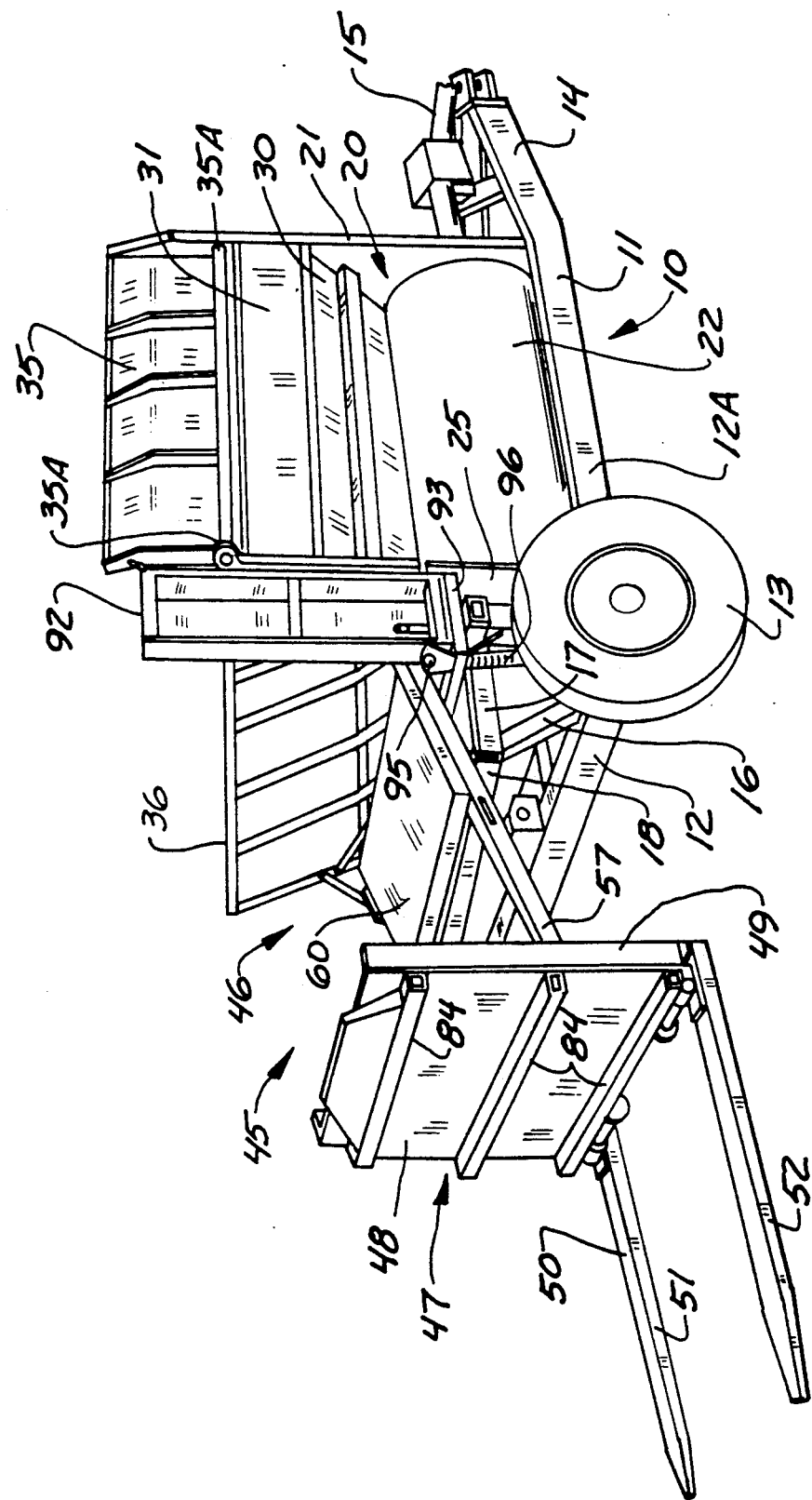
FIG. 1 is a rear perspective view of a bale shredder having a fork lift and bale storage mechanism made according to the present invention installed thereon.

As stated, the overall configuration of the bale shredder cylinder, and the bale shredding chamber, and the adjustment shields and the like are all substantially identical to that shown in U.S. Pat. No. 4,449,672. The frame is changed in order to provide for two wheels at the rear because of the need for carrying extra weight when two bales are lifted, and of course the bale chamber is not mounted on a longitudinal pivot as is in the previous U.S. Pat. No. 4,449,672 inasmuch as rear loading is utilized.

The combined bale hauler and shredder is illustrated generally at 10 and includes a frame assembly 11 that has a cross axle 12 at the rear end, which has end spindles on which suitable wheels and tires 13 are mounted in a normal manner. The frame 11, has forwardly extending side frame members 12A fixed to axle 12 and the members 12 join a forwardly extending tongue 14 which is attached to a tractor or other prime mover (not shown). A power take off drive indicated at 15 is used for powering the bale shredder flail type cylinder as is well known in the art.

The frame includes suitable supports extending upwardly from the axle 12 such as those shown at 16, and other frame members including longitudinal member 17, and cross members 18 that are used for supporting various components. A main flail shredding housing indicated generally at 20 is supported to the frame 11 and has a forward end plate 21, a rear end plate 25, and a part cylindrical side wall 22. The front and rear end plates 21 and 25 mount a flail rotor 23 on a suitable shaft 24. The shaft 24 is mounted in bearings in the end plates 21 and 25, so that the flail will rotate and can be directly powered by the power take off shaft 15. The end plate 21 can be formed into suitable sections, and spaced slats 30 form a support wall above the part cylindrical wall 22. The slats 30 joins a vertical side wall 31 that extends in fore and aft direction and defines one side of a bale chamber 32.

Figure 2:
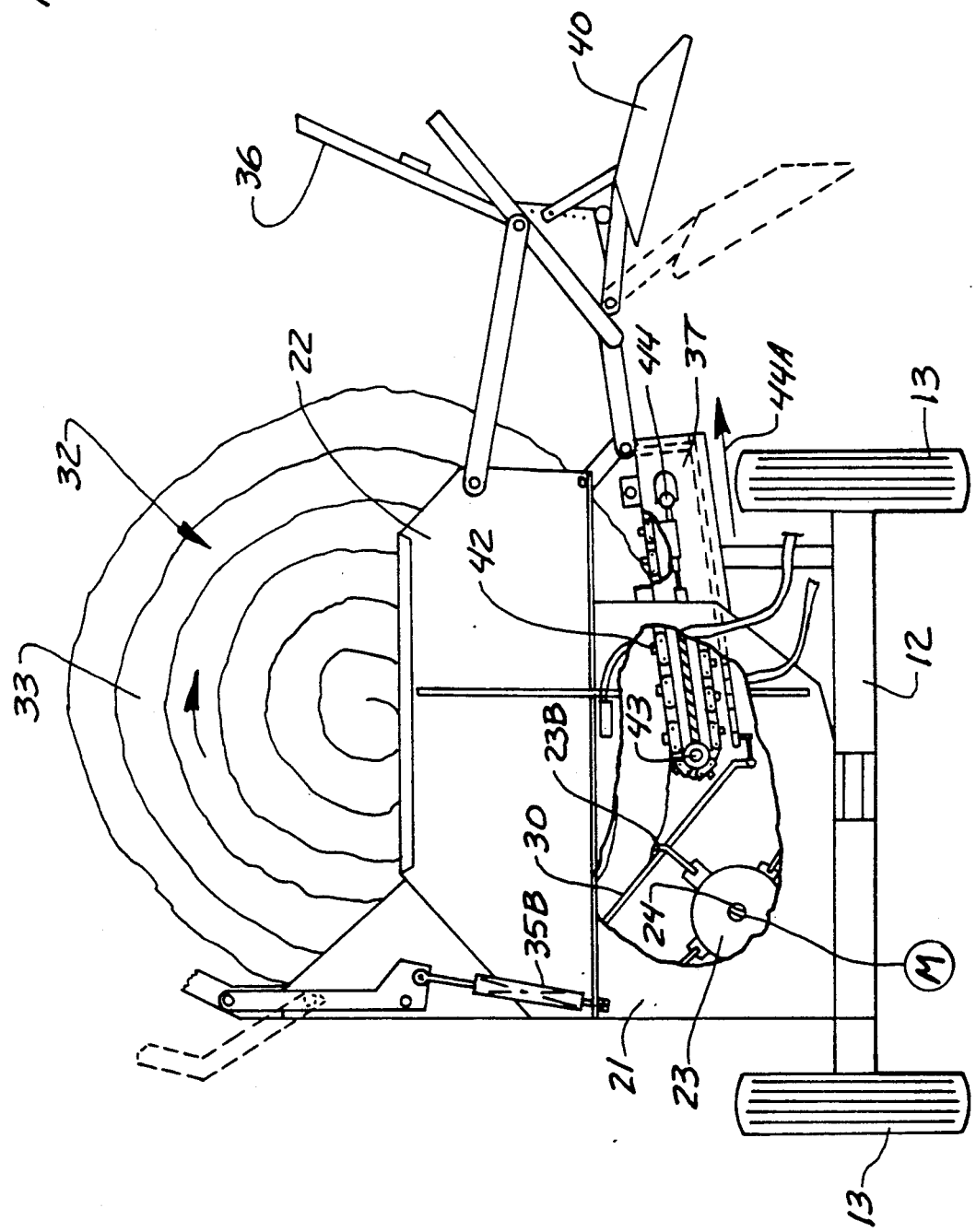
FIG. 2 is a front elevational view of the device of FIG. 1 with parts in section and parts broken away.

The vertical side wall 31 has front and rear upright frame members that have suitable hubs or pivot supports 35A on the upper end, and a hay guide 35 is positioned between the supports and pivotally mounted thereto, the hay guide is loaded with a spring 35B and can pivot about a longitudinal fore and aft axis generally as shown between the solid and dotted line portion in FIG. 2. The amount of pivoting can be controlled, and will depend on various factors in order to permit hay bales that are being inserted into the unit to clear the side guide 35 so that the bales will fall into the bale shredding chamber which is indicated at 32. A bale is shown at 33 and is actually shown partially shredded. In general, these bales are large enough so that they will extend out and rest against an outer hay guide frame 36 that is supported onto a bale conveyor chain support 37 in a suitable manner. This is usually fixed in position, to support the hay bale in the chamber 32. The support 36 is slatted, and a deflector shield 40 is pivotally mounted to frame 36 and deflects material that is discharged from the side, as is known. The slats 30 overlie the flail rotor and form a support wall for a bale 33 in chamber 32.

A bale conveyor support 37 supports a slat and chain conveyor 42 that shows spaced chains with slats between the chains. The chain is mounted on inner sprockets 43, and outer sprockets that are mounted on a shaft 44. The outer sprockets and shaft 44 are adjustably mounted on a pair of support plates 37. The conveyor 42 can be powered through the use of a hydraulic motor so that the slats will tend to move the bottom of the bale inwardly toward the flail rotor assembly 23, so that the flails or knives, indicated generally at 23B, which pass through spaces between slats 30 will engage the bottom of the bale 33 and carry material around so that it is discharged outwardly through a side discharge opening in direction as indicated by the arrow 44A. The chain and slat conveyor operation and the shredding is explained in U.S. Pat. No. 4,449,672. Once the bale is in the chamber 32, and is supported therein as shown in FIG. 2, it is shredded in the same manner as in U.S. Pat. No. 4,449,672.

Figure 3:
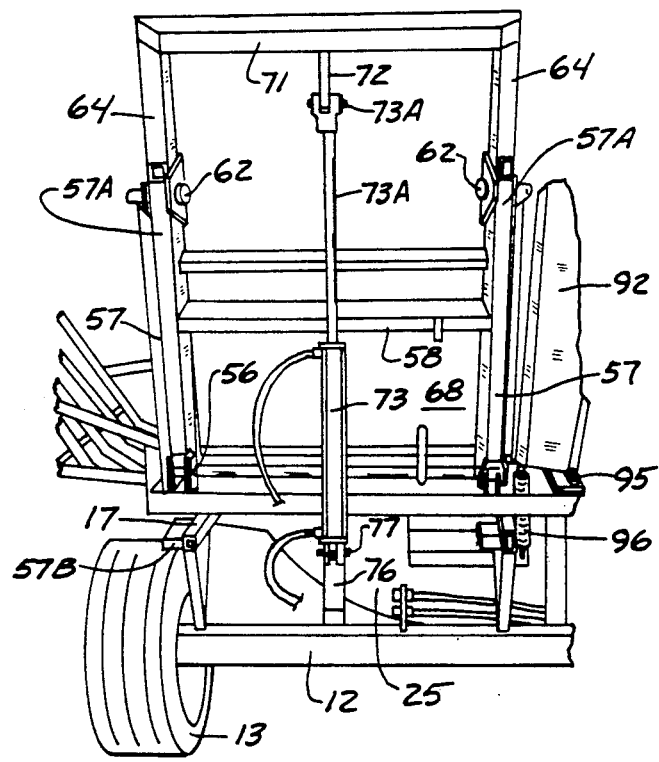
FIG. 3 is a part schematic perspective rear view of the device of FIG. 1 with the lift fork and support platform shown in a raised position.

The bale lifting, loading and storing mechanism indicated generally at 45 can be seen in FIGS. 1, 3, and in the side views of FIGS. 4 through 11. The assembly includes a pivoting lift fork support platform 46, a fork assembly 47 which includes a slide platform 48 slidable mounted onto a fork backstop assembly 49, and a fork 50 that is made up of individual tines 51 and 52 that are mounted onto the tine or fork backstop wall 49. The frame 11 as stated had main fore and aft members 12A that are supported back to the main axle 12. The upright support 16 that extend upwardly from the main axle 12 support the fore and aft frame members 17 as shown in FIG. 5. A cross member 54 is mounted on the top of the fore and aft members 17 and extends laterally across the frame, and in turn has suitable supports for pivotally mounting the lift fork support platform 46 about a pivot axis indicated at 56 in FIG. 5. The support platform 46 has a pair of fore and aft extending tubular arms 57,57 and is held into a frame assembly with a suitable cross member 58 (see FIG. 3) and a support platform plate 60.

Figure 4:
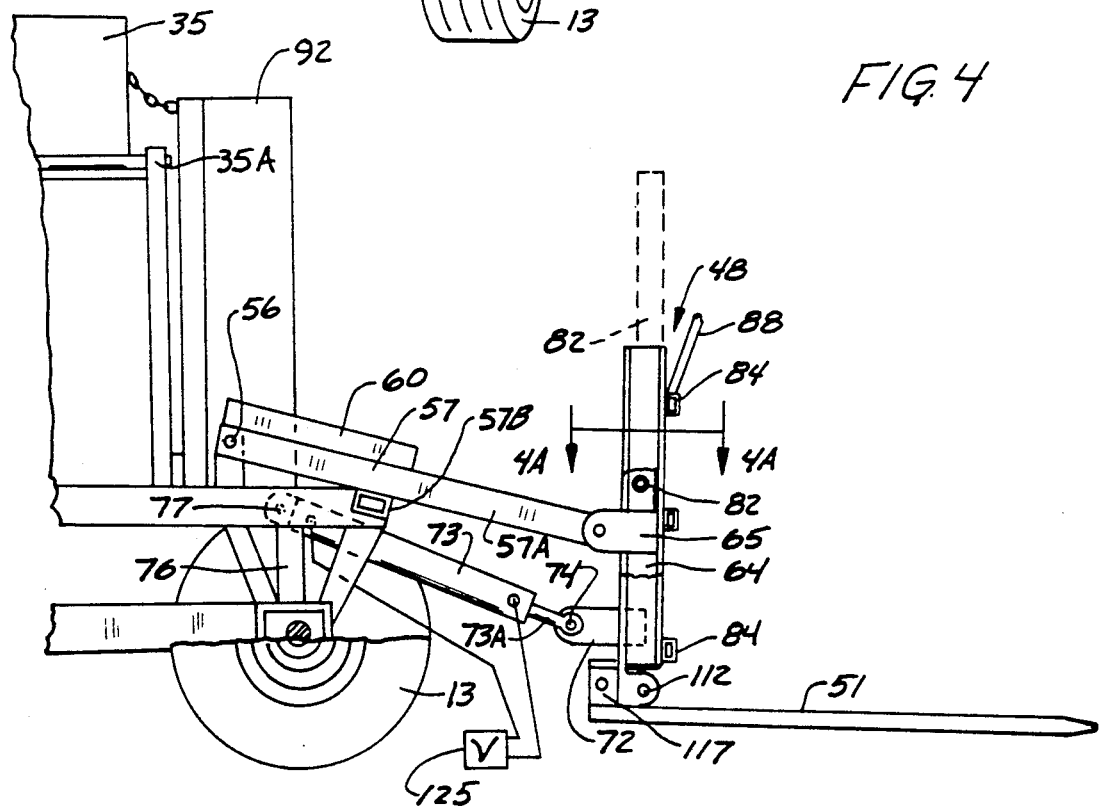
FIG. 4 is a fragmentary side elevational view of a bale lift fork and support platform made according to the present invention with parts in section and parts broken away.

The support platform plate 60 is fixed in position, relative to the arms 57, and raises and lowers about the pivot axis 56 when the arms 57 are pivoted to move the support platform. Suitable cross members can be used near the pivot axis 56 as well for making a rigid frame. The support plate 60 terminates just short of the longitudinal center of the arms 57,57, and the support platform arms thus have outwardly extending portions 57A that have suitable hubs thereon for in turn supporting the fork backstop assembly 49 for pivotal movement about a pivot axis of pins 62. The backstop assembly includes a backstop frame 63, and the slide plate 48, which is made so that it will slide along backstop side frame arm members 64 under the force of gravity. In FIG. 4, the slide plate assembly is shown in an initial retracted position, and in FIG. 5 it is shown in its extended position wherein it overlies the support plate 60. The slide plate assembly 48 will support a hay bale as it moves to the extended position for further movement into the bale chamber 32.

The backstop side arms 64 are aligned with the main support platform arm outer portions 57A, and overlie the arm portions 57A when pivoted to position as shown in FIG. 5. The forks of arms 64 are held in place with suitable support ears 65 that are welded to opposite sides of the arms 64, as can be seen in FIG. 4A. Pivot pin 62 pivotally mounts the ears 65 to the support platform arm portions 57A, so that the entire backstop assembly 49 can be pivoted about the pivot axis 60 of pins 62.

Figure 14:
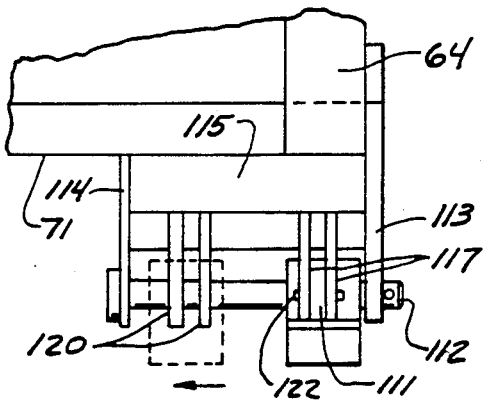
FIG. 14 is a rear view of the device of FIG. 13.

The arms 64 are held together with a suitable cross plate 70, and cross members as desired, including a lower cross member 71 that forms a tine mounting frame (see FIGS. 4 and 14). A lug or ear 72 is mounted to the midportions of the cross member 71. A hydraulic actuator 73 has an internal piston and an extendable and retractable rod 73A that is pivotally mounted as at 74 to the lug or ear 72. The base end of the actuator 72, that is the cylinder end, is mounted to a suitable support 76 which is supported back down to the main axle 12. The actuator 73 is pivotally mounted at a pivot pin indicated at 77, in dotted lines in FIG. 4.

The slide plate assembly 48 is slidably mounted onto the arms 64, for movement in longitudinal direction of the arms, as can be seen perhaps best in FIGS. 4 and 4A.

The arms 64 mount suitable spacers 79 on the outer sides thereof, to provide a suitable spacing for the ears 65. A fixed pin 81 mounts a roller 82. There are two of these longitudinally spaced rollers 82 on each arm, as shown in FIG. 4A. One roller is near the ears 65, and another is at the outer end of each of the arms 62, as shown in dotted lines in FIG. 4. The slide assembly 48 comprises a cross plate 83 that is a solid plate, and it has a plurality of square tube cross supports 84 thereon that extend above the surface of the plate 83 as shown in FIG. 4. A spacer tube 85 is positioned on each side of and below the cross plate 83 to provide for adequate clearance for the plate 70. Channel shaped guides or tracks 86 are fixed to the spacer tubes 85, and have inwardly faced legs that straddle the rollers 82 and form tracks which are supported by the rollers. The tubes 85, and the channels 82 are broken away in the center portions of FIG. 4 to show the ears 65 in position on the arms 64, and in FIG. 5, these parts are broken away to show the aligning ends of the arms 64 and the support platform plate 60. The slide assembly 48 can move from its position shown in FIG. 4 under gravity when tilted far enough upwardly so that it will be guided by the rollers 82 to extend back toward the mounting of arms 57, beyond the ends of the arms 64 to overlie the support platform plate 60 on the support frame 46.

The slide plate 48 can slide and carry a bale supported thereon to a position wherein the bale will be easily deposited in the bale shredding chamber. The sliding movement toward the bale chamber is stopped by stop plates 86A on the ends of chamber tracks 86. The stop plates engage the outermost rollers 82 and are held from further movement toward chamber 32.

A hay guide lip 88 is welded to the cross member 82, closest to the pivot of arms 57, as shown in FIG. 5, and provides a guide for a hay bale that is being slid into the bale shredding chamber 32.

The actuator 73 can be extended and retracted as desired with a sortable valve, to cause the lifting of a bale as will be more fully explained.

Figure 12:
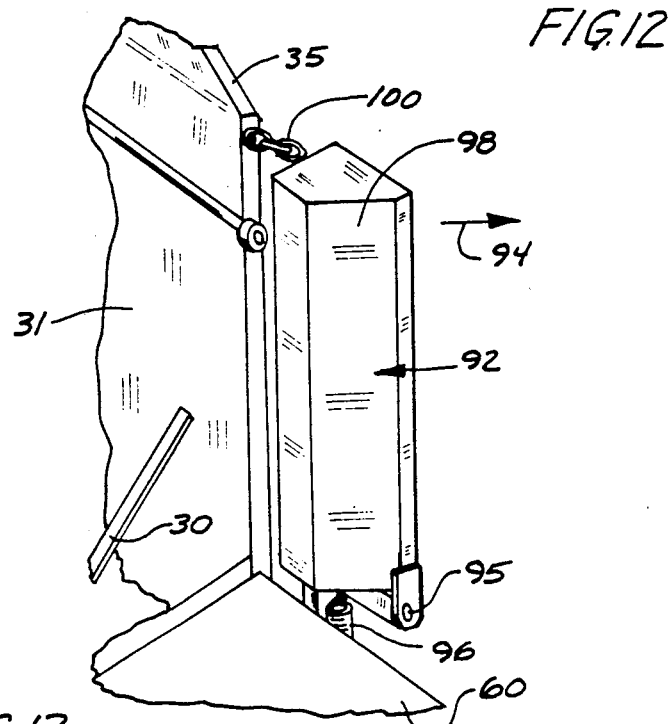
FIG. 12 is a fragmentary perspective view of a spring loaded spillage shield positioned along one lateral side of the bale chamber and aligned with the bale lift support platform used for loading.

A spring loaded spillage prevention shield indicated generally at 92 (see FIG. 12) is pivotally mounted to a side of the frame about a fore and aft axis on a suitable support 93 that can be supported on a cross member of the frame. The spillage shield is spring loaded with a suitable spring to urge it to remain upright, but the top of shield can be moved laterally outwardly under a spring load as indicated by the arrow 94 in FIG. 12. The pivot axis indicated at 95 permits pivotal movement, a spring 96 has one end anchored back down to a portion of the frame, such as the cross axle 12 and the other end is attached to the spillage shield 92. The spillage shield has a guide or tapered wall 98 on the side facing the left fork that is engaged by a bale moving inwardly toward chamber 32. The spillage shield is generally a hollow upright member that provides for guiding hay bales into the chamber 32 for shredding.

A chain 100 is connected between the upper part of the spring loaded spillage shield 92 and the hay guide 35, so that upon movement of the spillage shield out of the way because of hay acting on the tapered surface 98, the hay guide 35 also will be pivoted out of the way against the load from the spring that keeps the hay guide against a suitable stop (not shown).

Figure 13:
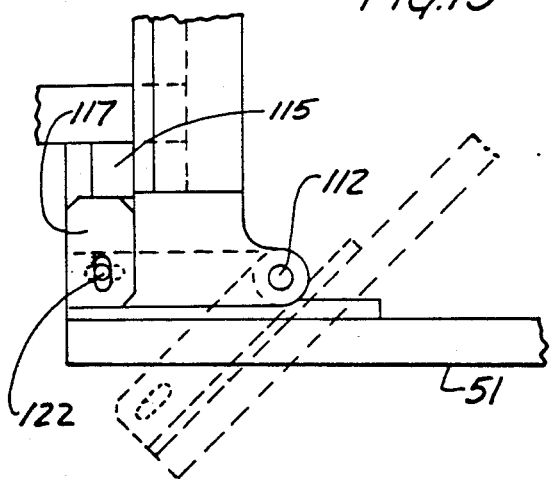
FIG. 13 is a fragmentary enlarged side elevational view of the base end of the bale lift fork tines to illustrate a support that permits adjusting the tines transversely.
Figure 15:
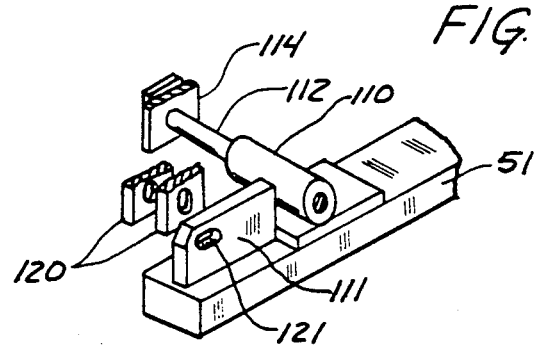
FIG. 15 is a perspective view showing a mounting pin for the lift fork tines, with a tine in one position and illustrating the length of the pin for permitting movement of the tines to a second position.

The lift fork support for the tines 51 and 52 permits adjusting the tines laterally relative to each other between two positions. The adjustment for tine 51 is shown at FIGS. 13, 14 and 15, and it can be seen that the tine has a base ends on which a pivot sleeve 110, and a latch plate 111 are mounted. The latch plate is an upright plate positioned behind the pivot sleeve and welded thereto to form a secure assembly. The arms 64 and the cross member 71 support a slide pin 112 on a suitable ear 113 that is mounted to the wall of arm 64 and an ear 114 that is fixed to a spacer bar 115, and to the cross member 71 in a suitable manner. These ears 113 and 114 extend forwardly from the cross member 71, and spacer bar 115 is below the cross member.

Two sets of lock ears 117,117 and 120,120 are provided at the rear of the cross member 71, and when the tine 51 is mounted on the pin 112 through the sleeve 110, the latch dog 111 will fit between one of the pairs of ears 117 or 120 and can be held in place for secure support and use. The latch dog 111 has a cross slot 121 therein, and the ears 117 and 120 have vertical slots as shown in FIG. 13. A pin 122 is used for latching the ends of the tines in position relative to the ears 117 or 120, depending on the position of the tine. When pin 122 is removed, the tine can be pivoted about the pin 112 as shown in dotted lines in FIG. 13 so that the lower part of the latch dog will clear the ears 117 or 120, and then the sleeve or hub 110 can be slid along the pin 112 to its second position. For example, if the tine is in the position within the ears 117, that is the widest spacing position for the tines, it can then be slid over to the narrower position so that the latch dog or plate 111 will fit between the ears 120, and the pin 122 can then be slipped into place to hold the tine securely in position. The adjustment support for the tine 52 is the same as for tine 51.

The actuator 73 can be a double acting actuator, operated through a valve 125, to direct the flow of fluid from a pump to the base end of the actuator 73 and extend the rod member 73A, which acts through the pin 74 to control pivotal movement of the fork assembly 47 as well as the main support assembly 46.

Figure 6:
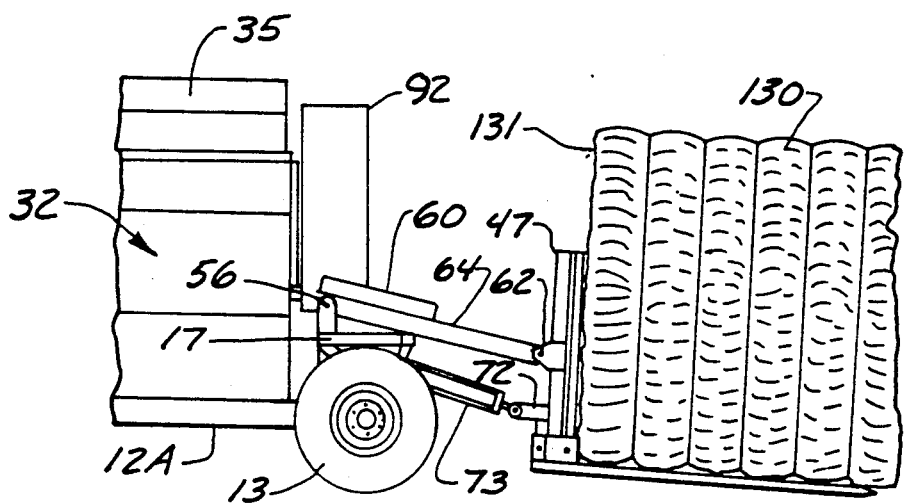
FIG. 6 is a side elevational view similar to FIG. 4, showing a bale on the lift fork in position prior to lifting a first bale into a bale shredding chamber.
Figure 7:
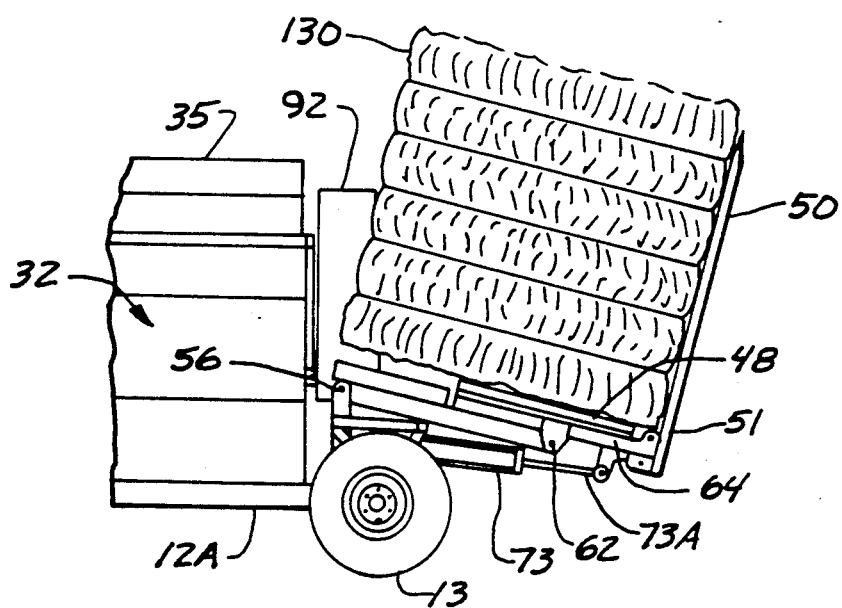
FIG. 7 shows the bale in a loading position with the lift fork mechanism tilted to a position wherein the back rest at the base end of the forks is resting on a pivoting support platform.

FIGS. 6 through 11 show a typical sequence of loading bales, and the parts are shown schematically. In FIG. 6, the fork assembly 47 is in a position with the forks or tines on the ground, and the actuator in a retracted position. The arms 57 are supported on stops 57B which are fixed to the frame member 17, as shown in FIG. 4 when the fork is in its lowered position. The frame 11, as supported on the wheels and tires 13, can then be backed up to slide the tines under a large hay bale 130. The initial loading is with no hay in the bale shredding chamber 32.

The fork assembly 47 is made so that the tines 51 and 52 slide under the hay bale 130, and the fork backstop assembly 49 and, in particular, the slide plate 48 will engage against an end surface 131 of the hay bale. The actuator 73 can then be operated to tilt the fork assembly about the pivot pins 62 to bring the frame arm members 64 into a position wherein they rest upon the arms 57, and specifically the forward portions 57A. The channel members 84 supporting the slide plate are positioned so that they will support the slide plate 48 above the support platform plate 60 on the support platform 46.

Figure 8:
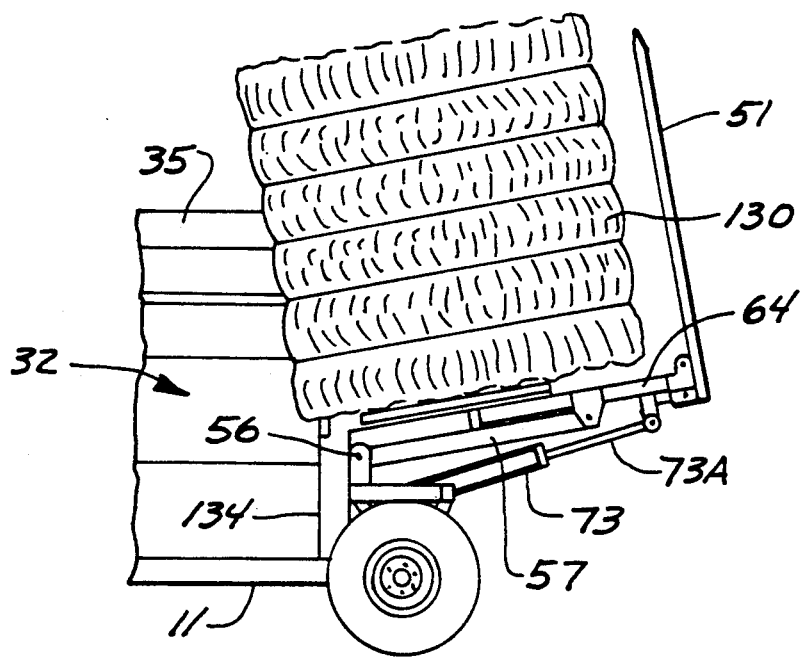
FIG. 8 is a view showing the pivoting support frame, and fork pivoted upwardly to a position wherein the bale being lifted has moved toward the bale shredding chamber.

Further extension of the rod 73A of the actuator causes the main support assembly to pivot about pivot 56, so that the arms 57 tilt upwardly, and then the slide plate 48 will slide on the support rollers 82, to the position shown in FIG. 8. This is the same position as shown in FIG. 5 without the hay bale. The bale 130, as can be seen is moved away from the tines 51 and 52 and is about a rear wall illustrated schematically at 134 for the bale chamber 32. The spring loaded spillage shield 92 will be engaged by the bale as the hay bale starts to slide in to chamber 32 because of the increase in diameter of a cylindrical bale member having a substantially vertically oriented axis, and as the shield 92 moves, it will pull the hay guide 35 away from the chamber so that the bale 130 will move into the chamber.

Figure 9:
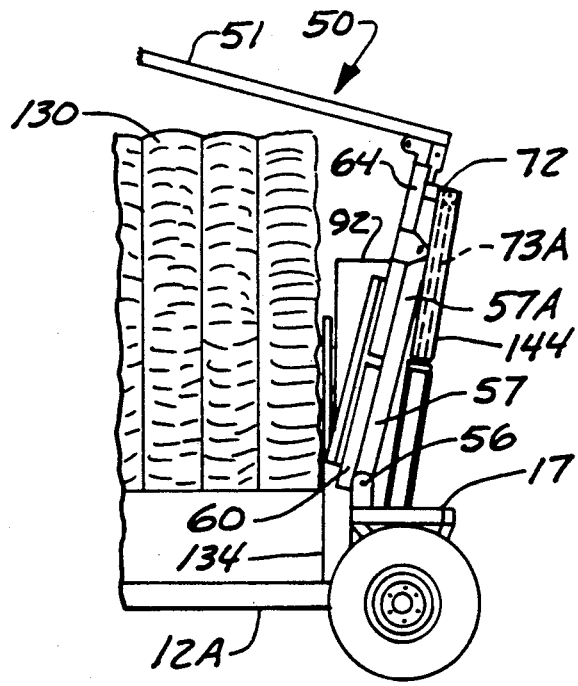
FIG. 9 is a view showing the final raised position of the bale lift fork and support platform showing the bale in the bale shredding chamber with the axis of the cylindrical bale parallel with the axis of the flail used for shredding.

The actuator 73 is continued to be operated to further extend the rod 73A, to cause the support arms 57 to move almost vertically as shown in FIG. 9. The hay bale 130 then will tumble off the slide plate 48, under the force of gravity, and will drop into the chamber 32, with the longitudinal axis of the generally cylindrical hay bale parallel to the axis of the rotor, and in position for shredding. The lip member 88 and cross tubes 84 cause the bale to tumble off the slide plate. The hay bale will be resting on the conveyor 42 that rotates the bale for shredding and moves the lower side in toward the flails in the manner that is known in the field.

Figure 10:
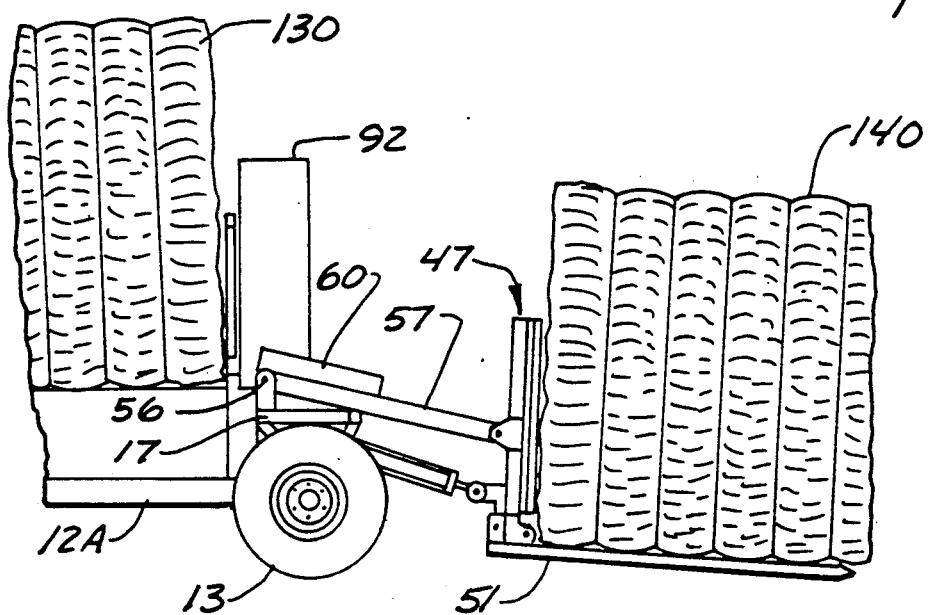
FIG. 10 is a side view similar to FIG. 6 showing a second bale being engaged by the lift fork.
Figure 11:
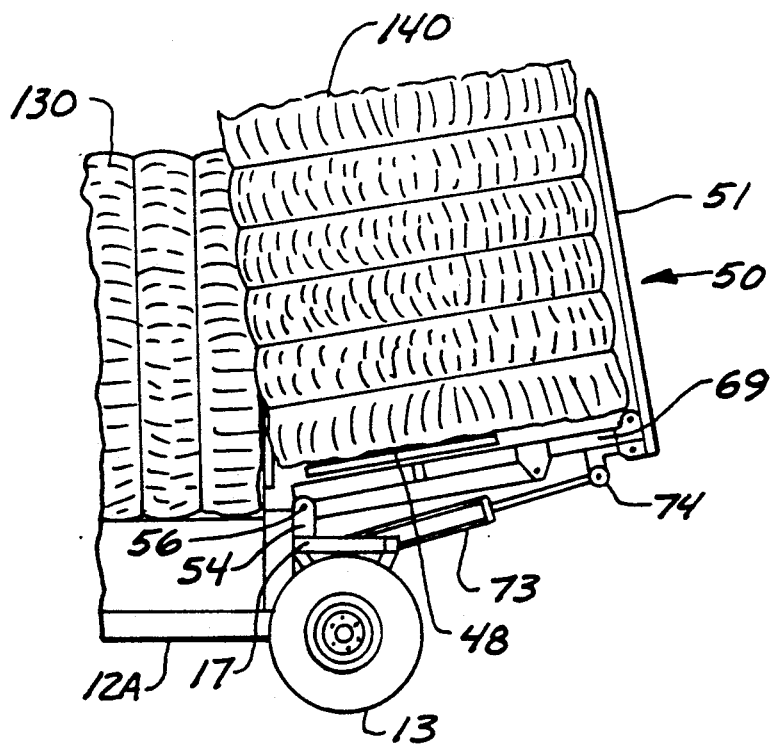
FIG. 11 is a view similar to FIG. 8 illustrating the storage position for the second bale resting against the bale in the shredding chamber after lifting the left fork and support platform.

To load a second hay bale, the fork tines are again dropped, and as shown in FIG. 10 a second hay bale 140 can be lifted by the fork assembly 47 in the same manner as before, with the tines 51 and 52 underneath the bale and along the side of the bale. The lifting steps or procedures shown in FIG. 7 will repeat, with the tilting of the fork about the pivot 62 so that the second hay bale will be moved upwardly, and as the actuator 73 is continued to operate, the bale 140 will be moved up to a position as shown in FIG. 11, which corresponds to the position shown essentially in FIG. 8 with the end of bale 140 resting against the end of the bale 130. Then the shredding unit will be ready for transport with the bale 140 being held on the main support assembly, with the tines 51 and 52 preventing the bale from tipping rearwardly off the unit, and the bale 130 holding it against its forward side.

If desired, a suitable stop member 144 can be placed between the pin at pivot 74 and the end of the cylinder housing for the actuator 73 to provide a mechanical stop to prevent the bale from dropping. This can be a gravity actuated stop that is held up against the underside of the main support until such time as the stop 144 is needed. Then a latch can be released and the stop will drop in place. Other types of mechanical safety stops can be utilized as well.

Again, depending on the size of the bale, the fork tines 50 and 51 can be adjusted laterally with the mechanism shown in FIGS. 13, 14 and 15, so that it has quite wide adaptability and will permit carrying two bales to a remote location where the bales will be sequentially shredded. Once the bale 130 is shredded completely or substantially completely, the actuator 73 will be operated again to move the support platform to the position shown in FIG. 9 which will cause the bale 140 to be dumped into the shredding chamber 32.

Although the present invention has been described with reference to preferred embodiments, workers skilled in the art will recognize that changes may be made in form and detail without departing from the spirit and scope of the invention.

What is claimed is:

1. A bale shredder supportable on a ground surface, having a shredding rotor and a bale chamber for holding large bales in which shredding occurs, the improvement comprising a lift fork assembly mounted on said shredder and including a main support member having one end pivotally mounted to a frame of said bale shredder, and a fork comprising a backstop and a pair of tines, the fork being pivotally mounted to a second end of said main support member, said tines being movable about the pivotal mounting of the fork when the main support member is in a lowered position to a position wherein the tines are generally parallel to and adjacent the ground surface so that the tines pass under portions of a large cylindrical bale to be shredded, the bale having a length axis and opposite ends, with the tines parallel to a length of said bale, and the tines and backstop being pivotable relative to the main support member until the backstop and the main support member lie generally along parallel planes and the tines extend upwardly, without substantial movement of the main support member about its pivotal mounting to the frame, said main support member and fork thereafter being pivotable as a unit to an intermediate position wherein a bale supported on the backstop will slide while supported on an end thereof to a position adjacent the bale chamber in direction away from the tines and upon further pivoting of the main support member and fork a bale will be caused to move into the bale chamber, said main support member and said fork being movable about their respective pivotal mountings to lift a second bale adjacent to the intermediate position and being of size to permit holding a second bale elevated from the ground with the first bale in the bale chamber, and extendable and retractable actuator means acting along a single plane of movement during extension and retraction and having one pivotal mounting of one end of the actuator means to the frame at an axis offset from the pivotal mounting of the main support member to the frame and a pivotal mounting of second end of the actuator means to the fork at an axis offset from the pivotal mounting of the fork to the main support member, said actuator means single plane of movement being positioned to cause the sequence of pivoting of the fork and subsequent pivoting of the main frame member.

2. The shredder as specified in claim 1 wherein said backstop for said fork comprises a slide plate, said slide plate being movable to a position overlying a portion of said main support member adjacent the frame of the shredder when the main support member is elevated to its intermediate position, wherein gravity moves said slide plate toward the bale chamber of the shredder with a bale supported on end on said slide plate.

3. The shredder as specified in claim 1 wherein said fork has means for mounting said tines to said backstop for permitting adjusting the lateral spacing between the tines.

4. The shredder as specified in claim 3 wherein said means for mounting said tines comprises a transversely extending mounting shaft for each of said tines, and a latch to latch said tines in a selected one of a plurality of positions along the axis of said shaft members.

5. The shredder as specified in claim 4 wherein said latch comprises a latch lug mounted on a rear portion of each of said tine, said tines being pivotally mounted on its respective shaft member at locations spaced from said latch lug, a pair of ears mounted on said backstop for receiving said latch lug and permitting pinning of the latch lug relative to the ears, said latch lug being movable to a position clearing said ears when an outer end tip of the respective tine is tilted relative to the backstop a sufficient amount.

6. A bale shredder having a shredding rotor, a shredder frame and a chamber formed for holding large bales for shredding wherein the improvement comprises a lift and storage fork assembly including a fork frame and a pair of tines mounted on the fork frame, a support frame pivotally mounted to the shredder frame along an axis adjacent an edge of the bale shredding chamber and having arms extending outwardly, the fork frame being pivotally attached to the outwardly extending ends of the arms of the support frame, said tines being pivotally movable to a position wherein they are generally parallel to and adjacent a support surface so that the tines pass under portions of a large bale to be shredded and which is also supported on the support surface, and upon pivotal movement the tines tilt a bale relative to the support member until an end of the bale overlies at least a portion of the support frame with the tines extending generally upwardly, actuator means connected between the shredder frame and the fork frame and positioned relative to the pivotal mounting of the support frame to the shredding frame and fork frame, respectively, so that upon extension of the actuator means, the actuator means causes the pivotal movement of the fork frame to tilt the fork frame, the same actuator means being further extendable to subsequently move the support frame about the support frame pivot to a position wherein a bale lifted on the fork assembly will tumble into the bale chamber, the fork assembly and support frame being operable by the same actuator means to be lowered to engage a second bale, and upon subsequent extension of the same actuator means, tilt and lift such second bale for transport with a first bale in the bale chamber and the second bale supported on the support frame and with the tines extending upwardly.

7. The shredder as specified in claim 6 wherein said fork frame comprises a slide plate, said slide plate being movable to a position adjacent the tines and mounted on the fork frame generally perpendicular to the tines, spaced from the tines and to a position overlying a portion of said support frame adjacent the shredder frame when the support frame is elevated to position wherein gravity moves said slide plate toward the bale chamber of the shredder with a bale supported on said slide plate.

8. The shredder of claim 7, and a yieldably spring loaded wall adjacent a side of the bale shredding chamber and being spring loaded to yield as a bale moving from the support frame to the bale chamber engages the loaded wall to permit passage of a bale.

* * * * *

UNITED STATES PATENT AND TRADEMARK OFFICE
CERTIFICATE OF CORRECTION

PATENT NO. : 5,090,630
DATED : February 25, 1992
INVENTOR(S) : Ivyl D. Kopecky, Ruben D. Morlock It is certified that error appears in the above-identified patent and that said Letters Patent is hereby corrected as shown below:

Col. 8, Line 58, delete "tine," (1st occurrence) insert "tines,".

Signed and Sealed this

Twenty-fifth Day of May, 1993

Attest:

MICHAEL K. KIRK

*Attesting Officer*     *Acting Commissioner of Patents and Trademarks*